3,202,709
1,4(UNSYMMETRICALLY-SUBSTITUTED-BENZYL-AMINO- AND CYCLOHEXYLAMINO-METHYL)-CYCLOHEXANES

Leslie G. Humber, Montreal, Quebec, Gordon S. Myers, Mount Royal, Quebec, and Thomas Massiah, Montreal, Quebec, Canada, assignors to American Home Products Corporation, New York, N.Y., a corporation of Delaware
No Drawing. Filed June 24, 1963, Ser. No. 290,164
8 Claims. (Cl. 260—563)

This invention relates to novel chemical compounds, certain unsymmetrically disubstituted derivatives of 1,4-bisaminomethylcyclohexane.

These new chemical compounds, in base form, may be generically represented by the Formula I:

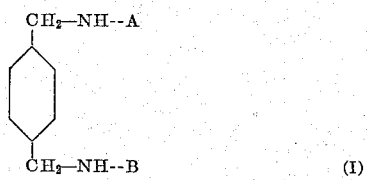

wherein A and B represent cycloalkyl, cycloalkylalkyl, benzyl or substituted benzyl and wherein A and B must be different from each other. When A or B is a benzyl grouping, it may be substituted by lower alkyl, lower alkoxy, halogen, di-(loweralkyl)-amino, hydroxy, acylamino, nitro, loweralkylthio, trihalomethyl or sulfonamido.

Said novel chemical compounds possess valuable pharmacological properties, being useful as agents for lowering serum cholesterol levels.

It is understood that the compounds of this invention are capable of existing in two geometrically isomeric forms, commonly called cis and trans depending on the orientation of the two side chains which are attached to the central cyclohexane nucleus. It is understood that the geometrical isomers of any of the compounds mentioned above are meant to be covered by this invention.

The novel chemical compounds possessing interesting biological activities, in base form, are thus N,N'-(unsymmetrically disubstituted) - 1,4 - bisaminomethylcyclohexanes. These compounds, being basic in nature, form tertiary acid addition salts. Such salts with pharmacologically acceptable acids are biologically equivalent to the free base and constitute a preferred form for the administration of the compounds of our invention.

Our preferred procedure for preparing the new chemical compounds may be described as follows: 1,4-bis-aminomethylcyclohexane is condensed with one equivalent of an aldehyde or ketone of the formula $R'—CO—R^2$ wherein $R'$ and $R^2$ together represent an alkylene chain or alternately $R'$ is hydrogen when $R^2$ represents a cycloalkyl, phenyl or substituted phenyl moiety. When the above phenyl group is substituted, it may be substituted by lower alkyl, lower alkoxy, halogen, di-(loweralkyl)-amino, hydroxyl, acylamino, nitro, loweralkylthio, trihalomethyl or sulfonamido moieties.

The resulting Schiff base is then reduced with a reducing agent, such as, for example, sodium borohydride, lithium aluminum hydride or hydrogen and a noble metal catalyst to yield a compound of the following Formula II:

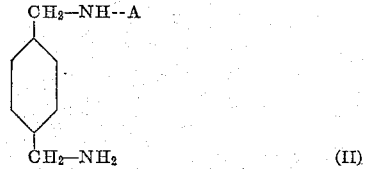

wherein A represents cycloalkyl, cycloalkylalkyl, benzyl or substituted benzyl.

The compound of Formula II, containing one primary and one secondary amino group, is then condensed with one equivalent of an aldehyde or ketone of the formula $R^3—CO—R^4$ wherein $R^3$ and $R^4$ together represent an alkylene chain or alternately $R^3$ is hydrogen when $R^4$ represents a cycloalkyl, phenyl or substituted phenyl moiety and said substituted phenyl moiety may bear the same substituents as those described above for $R^2$ and wherein $R^3—CO—R^4$ is different from $R'—CO—R^2$.

The resultant Schiff base is then reduced with a reducing agent as described above to yield the unsymmetrically disubstituted derivative of 1,4-bisaminomethylcyclohexane of Formula I which may be converted to an acid addition salt with a suitable pharmacologically acceptable acid by conventional means.

The following examples are given for specific illustration of the invention but it should be understood that they are selected for illustration of the invention and are not to be considered as limitative. All temperatures given are in degrees centigrade.

EXAMPLE 1

*Trans-1-(aminomethyl)-4-(o-chlorobenzylaminomethyl)-cyclohexane*

A 5 gal. stainless steel autoclave, equipped with an efficient agitator, is charged with 220 g. of trans-1,4-bis-(aminomethyl)-cyclohexane, 8 l. of absolute ethanol and 1.94 g. of platinum oxide catalyst (Adams catalyst). This mixture is cooled to 15° and it is added to a solution of 440 g. of o-chloro-benzaldehyde in 2 l. of absolute ethanol. The air is then purged from the autoclave with nitrogen and the nitrogen is in turn replaced by hydrogen to a pressure of 50–100 p.s.i. The reaction mixture is then warmed to 60° and catalytically hydrogenated at this temperature at about 50–130 p.s.i. The reaction is then stopped, the autoclave is purged with nitrogen, the catalyst is removed by filtration and the filtrate is concentrated to dryness to remove solvent. The crystalline residue so obtained is shaken with a mixture of water (12 l.) and ether (7 l.) and adjusted to pH 6 with acetic acid. The aqueous phase is separated, washed with ether (2 x 7 l.), and then made strongly alkaline with sodium hydroxide. This mixture is extracted with benzene; the benzene extract is concentrated and the residue so obtained is dissolved in 575 cc. of warm ethanol. The ethanol solution is cooled to 4° and the trans-1,4-bis-(o-chlorobenzylaminomethyl)cyclohexane which separates, melting point 96–99° is removed by filtration. The filtrate is concentrated to dryness and the residue is crystallized from a mixture of 500 ml. of isopropanol and 500 ml. of ether by chilling to −10° to give trans - (1-aminomethyl) - 4 - (o - chlorobenzylaminomethyl)cyclohexane, melting point 117–130°. This amine is converted to its dihydrochloride salt by dissolving it in 5 l. of methanol, treating the solution with gaseous hydrogen chloride and then precipitating the amine dihydrochloride by the addition of 5 l. of ether. This precipitate is purified by recrystallization from water to give trans-(1-aminomethyl)-4-(o - chlorobenzylaminomethyl) cyclohexane dihydrochloride, melting point 299–301°.

Elemental analysis confirmed the empirical formula $C_{15}H_{23}ClN_2$.

EXAMPLE 2

*Trans-1-(o-chlorobenzylaminomethyl)-4-(cyclohexylaminomethyl)cyclohexane*

Trans - 1 - (o - chlorobenzylaminomethyl) - 4 - (aminomethyl)cyclohexane (13.3 gm.) and cyclohexanone (4.9 gm.) was refluxed in benzene for four hours with removal of the liberated water with a Dean-Starke trap to yield the corresponding Schiff's base as an oil with a band in the infra red spectrum at 1660 cm.$^{-1}$.

It was reduced in methanol solution, with sodium borohydride (3.7 gm.) by refluxing for four hours. The reaction mixture was worked up as described in the previous example to yield trans-1-(o-chlorobenzylaminomethyl)-4-(cyclohexylaminomethyl)-cyclohexane as an oil with bands in the infra red spectrum at 1450, 2850 and 2940 cm.$^{-1}$.

A dihydrochloride salt was prepared in the conventional manner. It was crystallized from a methanol-ether mixture and had a melting point in excess of 310°.

Elemental analysis confirmed the empirical formula $C_{21}H_{35}Cl_3N_2$.

EXAMPLE 3

*Trans-1-(o-chlorobenzylaminomethyl)-4-(cyclohexylmethylaminomethyl)cyclohexane*

Trans - 1 - (o - chlorobenzylaminomethyl) - 4 - (aminomethyl)cyclohexane (13.3 gm.) and cyclohexanecarbonaldehyde (5.6 gm.) were combined in benzene (50 ml.) and refluxed for two hours. The liberated water was collected in a Dean-Starke trap.

Removal of the benzene by evaporation yielded the corresponding Schiff's base as an oil which possessed a strong band in the infra red spectrum at 1665 cm.$^{-1}$. It was dissolved in methanol (50 ml.) and treated with sodium borohydride (3.78 gm.). After refluxing for four hours, the solvent was removed in vacuo and the residue partitioned between water and ether. The ether layer was dried and evaporated to yield trans-1-(o-chlorobenzylaminomethyl)-4-(cyclohexylmethylaminomethyl) - cyclohexane as an oil with bands in the infra red at 1050, 1125 and 1450 cm.$^{-1}$.

A dihydrochloride salt was prepared with ethereal hydrogen chloride. It was crystallized from a methanol-ether mixture and has a melting point in excess of 310°.

Elemental analysis confirmed the empirical formula $C_{22}H_{37}Cl_3N_2$.

EXAMPLE 4

*1-(aminomethyl)-trans-4-(cyclohexylaminomethyl)-cyclohexane*

To a solution of trans-1,4-bisaminomethylcyclohexane (28.4 gm.) in refluxing benzene was added over a three hour period, cyclohexanone (19.6 gm.). The mixture was refluxed an additional three hours while the liberated water was removed azeotropically. The solvent was removed and replaced with methanol (300 ml.) and the resultant solution was refluxed overnight with sodium borohydride (10 gm.). The reaction mixture was worked up in the usual manner to yield 1-(aminomethyl)-trans-4-(cyclohexylaminomethyl)-cyclohexane as an oil, B.P. 110° (0.06 mm.). The dihydrochloride salt was prepared in the conventional manner and had a melting point in excess of 325°.

Elemental analysis confirmed the empirical formula $C_{14}H_{30}N_2Cl$.

EXAMPLE 5

*Trans-1-(cyclohexylaminomethyl)-4-(cyclohexylmethylaminomethyl)-cyclohexane*

Cyclohexanecarboxaldehyde (6.9 gm.) and 1-(aminomethyl)-trans-4 - (cyclohexylaminomethyl) - cyclohexane (13.8 g.) were converted to the corresponding Schiff's base by refluxing in benzene solution for six hours. It was reduced by refluxing in methanol solution with sodium borohydride (8.0 gm.) for 15 hours. The reaction mixture was worked up in the usual manner to yield trans-1-(cyclohexylaminomethyl) - 4 - (cyclohexylmethylaminomethyl)-cyclohexane as a light yellow oil. A dihydrochloride salt was prepared in the usual manner and it had a melting point in excess of 320°.

Elemental analysis confirmed the empirical formula $C_{21}H_{42}N_2Cl_2$.

We claim:
1. A compound selected from the group which consists of a 1,4-disubstituted cyclohexane wherein one of the substituents is selected from the group consisting of o-chlorobenzylaminomethyl and cyclohexylaminomethyl, and wherein the other substituent is selected from the group which consists of cyclohexylaminomethyl and cyclohexylmethylaminomethyl; and salts thereof with pharmacologically-acceptable acids.

2. A 1,4-disubstituted cyclohexane wherein one of the substituents is selected from the group consisting of o-chlorobenzylaminomethyl and cyclohexylaminomethyl, and wherein the other substituent is selected from the group which consists of cyclohexylaminomethyl and cyclohexylmethylaminomethyl.

3. 1-(o-chlorobenzylaminomethyl)-4-(cyclohexylaminomethyl)cyclohexane.

4. 1 - (o - chlorobenzylaminomethyl) - 4 - (cyclohexylmethylaminomethyl)cyclohexane.

5. 1-(cyclohexylaminomethyl) - 4 - (cyclohexylmethylaminomethyl)-cyclohexane.

6. The dihydrochloride salt of 1-(o-chlorobenzylaminomethyl)-4-cyclohexylaminomethyl)cyclohexane.

7. The dihydrochloride salt of 1-(o-chlorobenzylaminomethyl)-4-(cyclohexylmethylaminomethyl)cyclohexane.

8. The dihydrochloride salt of 1-(cyclohexylaminomethyl)-4-(cyclohexylmethylaminomethyl)-cyclohexane.

No references cited.

CHARLES B. PARKER, *Primary Examiner.*